(12) United States Patent
Nagatoshi

(10) Patent No.: US 12,443,124 B2
(45) Date of Patent: Oct. 14, 2025

(54) OPTICAL SCANNING DEVICE AND IMAGE FORMING APPARATUS MOUNTED WITH IT

(71) Applicant: CANON KABUSHIKI KAISHA, Tokyo (JP)

(72) Inventor: Jun Nagatoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/596,336

(22) Filed: Mar. 5, 2024

(65) Prior Publication Data

US 2024/0302767 A1    Sep. 12, 2024

(30) Foreign Application Priority Data

Mar. 7, 2023    (JP) ................................ 2023-034317

(51) Int. Cl.
*G03G 15/04*    (2006.01)
*G02B 26/12*    (2006.01)
*G03G 15/043*    (2006.01)

(52) U.S. Cl.
CPC ......... *G03G 15/0435* (2013.01); *G02B 26/12* (2013.01); *G03G 15/0409* (2013.01)

(58) Field of Classification Search
CPC ........... G03G 15/0409; G03G 15/0435; G03G 21/1666; G02B 26/10; G02B 26/12
See application file for complete search history.

(56) References Cited

U.S. PATENT DOCUMENTS

| | | | | |
|---|---|---|---|---|
| 5,900,961 | A | * | 5/1999 | Miyamoto ........... G02B 26/121 359/212.1 |
| 7,755,655 | B2 | * | 7/2010 | Kawasaki ............ G02B 26/121 347/152 |
| 2014/0375742 | A1 | | 12/2014 | Otoguro et al. ....... G03G 15/04 |
| 2015/0338768 | A1 | | 11/2015 | Nagatoshi et al. .. G03G 15/043 |
| 2017/0142283 | A1 | | 5/2017 | Tanaka et al. ......... H04N 1/113 |
| 2020/0103784 | A1 | | 4/2020 | Nagatoshi ............ G03G 15/043 |
| 2020/0310276 | A1 | | 10/2020 | Katayama et al. .... G03G 15/04 |
| 2021/0033852 | A1 | | 2/2021 | Sano et al. ............. G02B 26/12 |
| 2021/0103230 | A1 | | 4/2021 | Nagatoshi ............ G03G 15/043 |
| 2023/0105311 | A1 | | 4/2023 | Nagatoshi ............ G03G 15/043 |
| 2023/0341678 | A1 | | 10/2023 | Sano et al. ............. G02B 26/12 |
| 2024/0061358 | A1 | | 2/2024 | Nagatoshi ............ G03G 15/043 |
| 2024/0201487 | A1 | | 6/2024 | Nagatoshi .............. G02B 27/00 |

FOREIGN PATENT DOCUMENTS

JP    6376856 B2    8/2018

* cited by examiner

*Primary Examiner* — Sophia S Chen
(74) *Attorney, Agent, or Firm* — Venable LLP

(57) ABSTRACT

An optical scanning device includes a casing including a bottom portion on which the deflector is disposed and a side wall stood from the bottom portion, a circuit board, a cover closing an opening, formed by the side wall, of the casing. The side wall includes first and second side walls, and the second side wall includes a through hole, and first and second side surfaces of the through hole. The cover includes a protective portion for protecting the circuit board and a restricted portion disposed in a position corresponding to the through hole and including first and second end portions. The restricted portion includes first and second insertion portions to be inserted into the through hole. A distance between the second end portion and the second side surface is smaller than a distance between the protective portion and the closest electric element.

13 Claims, 8 Drawing Sheets

(a)

(b)

OPTICAL SCANNING DEVICE AND IMAGE FORMING APPARATUS MOUNTED WITH IT

FIELD OF THE INVENTION AND RELATED ART

The present invention relates to an optical scanning device which is mounted on an image forming apparatus such as a laser beam printer and a digital copier, and to an image forming apparatuses on which the optical scanning device is mounted.

As an optical scanning device which is used for an image forming apparatus of an electrophotographic type, there is one which deflects a light beam which is emitted from a semiconductor laser by a rotational polygon mirror and guides a deflected light beam onto a photosensitive member by optical components such as a lens and a mirror. In this way, an electrostatic latent image is formed on the photosensitive member (see Japanese Patent No. 6376856, for example). Such an optical scanning device is configured that a portion of a cover member of an optical scanning device is extended and a variable resistor on a circuit board is covered at the extended portion. In a configuration in which a circuit board for driving a semiconductor laser is mounted while it is exposed to an outside of a casing (hereinafter, referred to as an optical box), a packing material or a hand and clothes of an operator, etc. may come into contact with the circuit board when transporting the optical scanning device or mounting the optical scanning device inside a laser beam printer. In a case that a packaging material, etc. comes into contact with the variable resistor which adjusts a laser light quantity on the circuit board, the light quantity may be changed and an image density defect, etc. may be occurred. As a way to deal with this problem, it is configured to prevent contacting the variable resistor and prevent a variation of the laser light quantity by extending a portion of the cover member of the optical scanning device and covering the variable resistor on the circuit board at the extended portion.

However, in a conventional example, there is a problem in that a protecting portion which is provided with the cover member and covers the variable resistor may contact the circuit board when the cover member is assembled and may damage an electric element, etc. on the circuit board.

SUMMARY OF THE INVENTION

In response to the above issue, it is an object of the present invention, to provide an optical scanning device in which it is possible to assemble a cover member of the optical scanning device in an inexpensive configuration while protecting a circuit board.

In order to solve the problems which are described above, the present invention is provided with following configurations. An optical scanning device comprises a light source; a deflection unit configured to deflect a light beam emitted from the light source; a casing including a bottom portion on which the deflection unit is disposed and a side wall stood from the bottom portion; a circuit board provided on the side wall in a state of being exposed to an outside of the casing and mounted with a plurality of electric elements for driving the light source; and a cover member configured to close an opening, formed by the side wall, of the casing, wherein the side wall includes a first side wall provided with the circuit board and a second side wall parallel to a direction perpendicular to a plane of the circuit board, wherein the second side wall includes a through hole elongated in the direction perpendicular to the plane, a first side surface of the through hole forming a side close to the circuit board, and a second side surface of the through hole forming a side far from the circuit board, wherein the cover member includes a protective portion for protecting the circuit board in a state in which the cover member closes the opening, and a restricted portion disposed in a position corresponding to the through hole in the state in which the cover member closes the opening, the restricted portion including a first end portion closed to the first side surface and a second end portion closed to the second side surface, wherein the restricted portion includes a first insertion portion provided adjacent to the first end portion and inserted into the through hole when the cover member is assembled to the casing, and a second insertion portion provided adjacent to the second end portion and inserted into the through hole when the cover member is assembled to the casing, and wherein a distance between the second end portion and the second side surface in the direction perpendicular to the plane is smaller than a distance between the protective portion and the closest electric element of the plurality of electric elements to the protective portion in a state in which the first insertion portion and the second insertion portion are inserted into the through hole.

Further features of the present invention will become apparent from the following description of exemplary embodiments with reference to the attached drawings.

Figure 5:
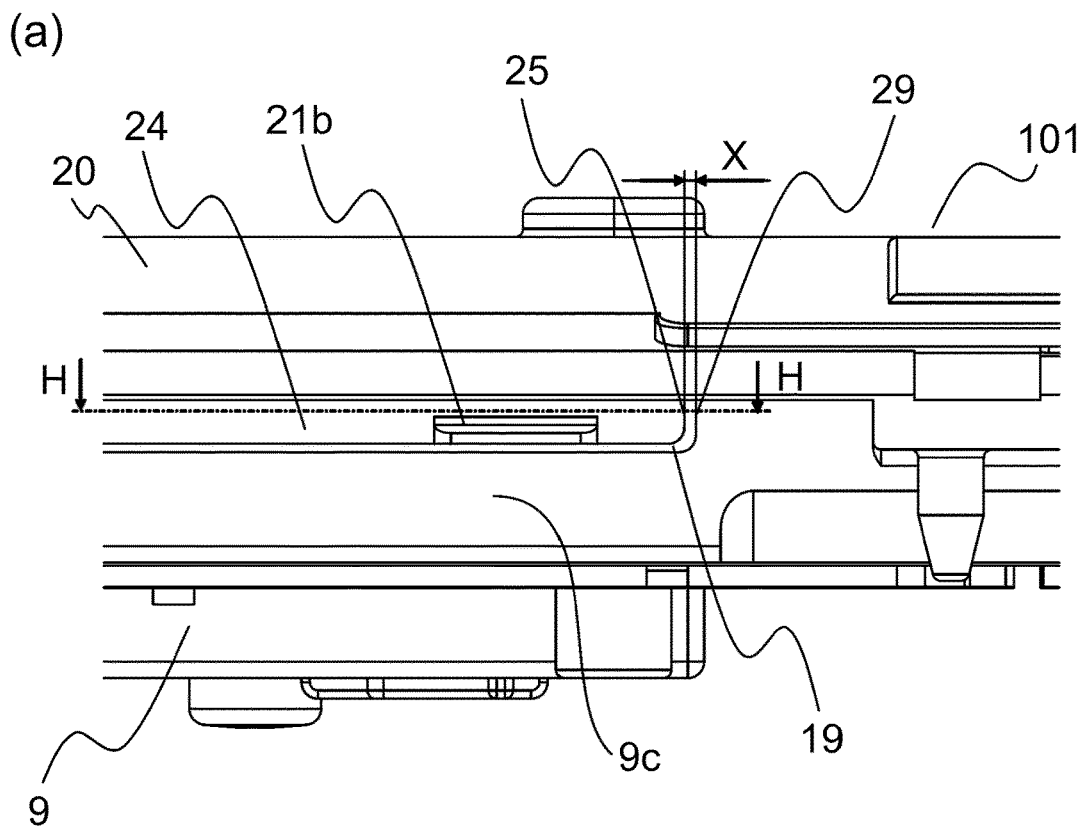
Figure 5:
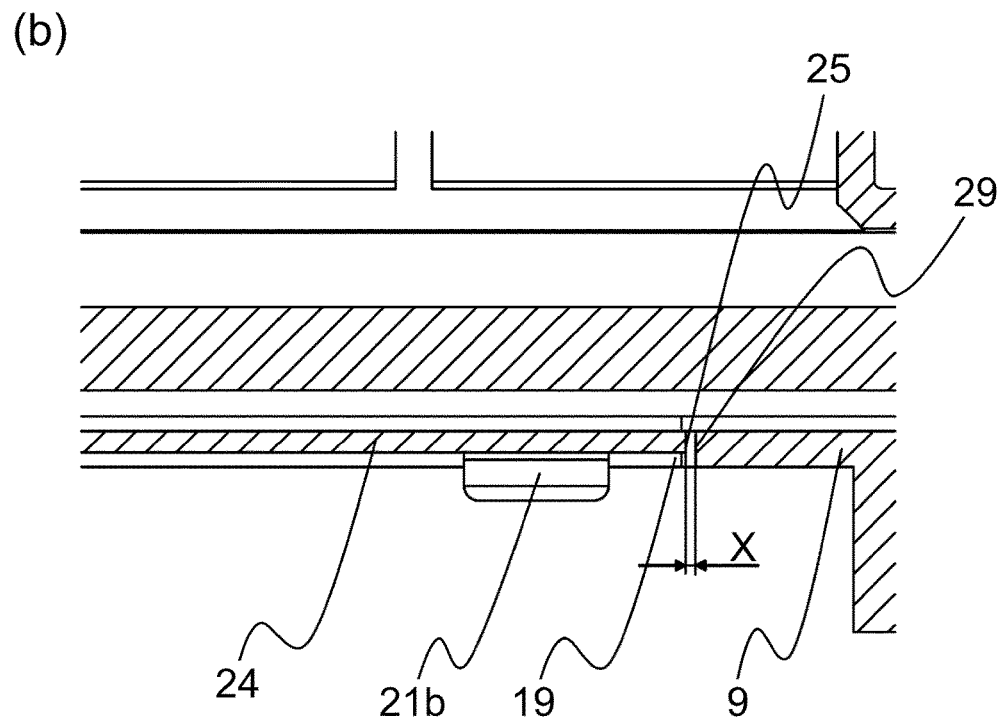

Part (a) of FIG. 5 is an enlarged view of the optical scanning device according to the embodiment when it is viewed from the front, and part (b) of FIG. 5 is a sectional view of it.

Figure 6:
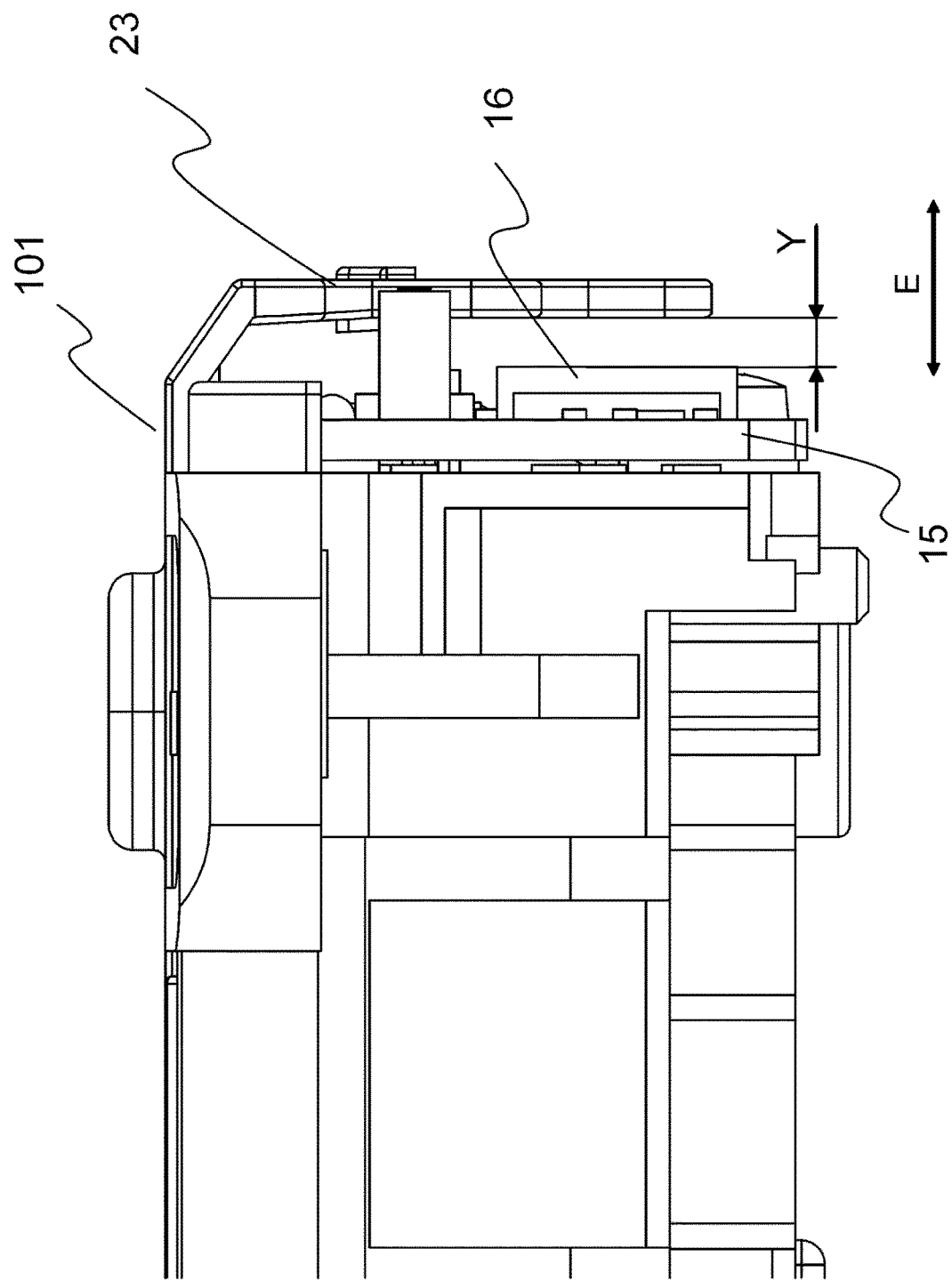

FIG. 6 is a view of the optical scanning device according to the embodiment, when it is viewed from a side surface side of a circuit board.

Figure 2:
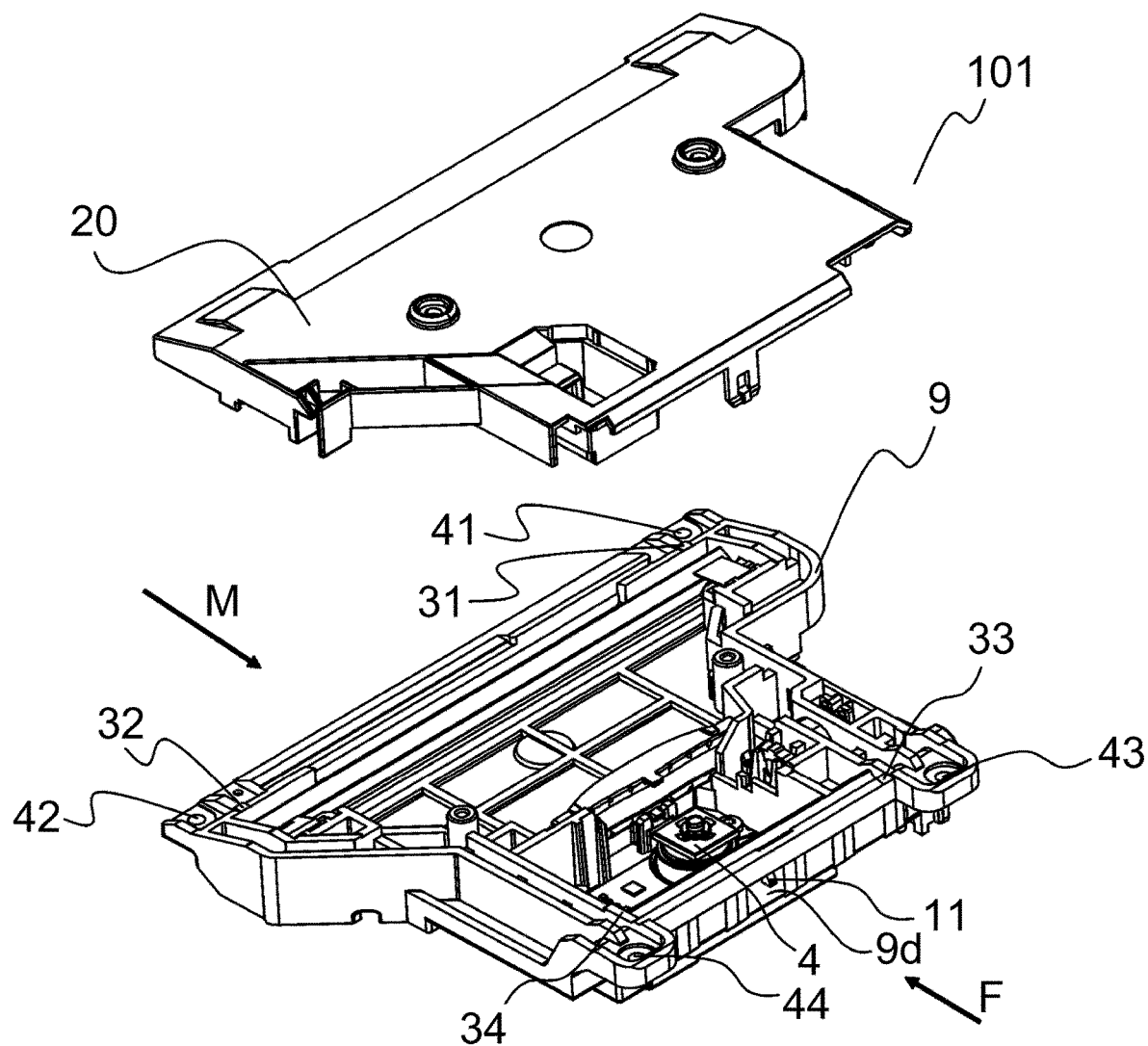
FIG. 2 is a view illustrating a configuration of a cover member and an optical box according to the embodiment.
Figure 7:
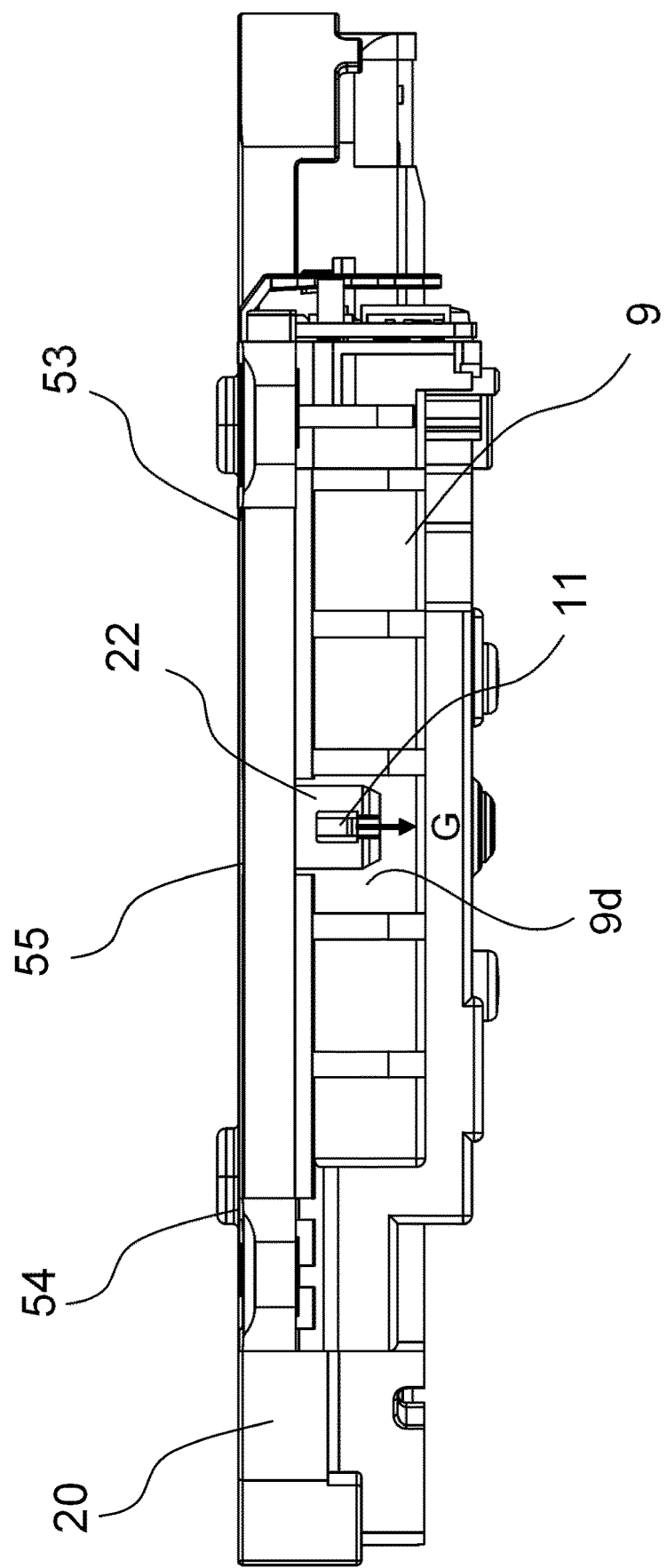

FIG. 7 is a view of the optical scanning device according to the embodiment, when it is viewed in a direction of an arrow F which is shown in FIG. 2.

Figure 8:
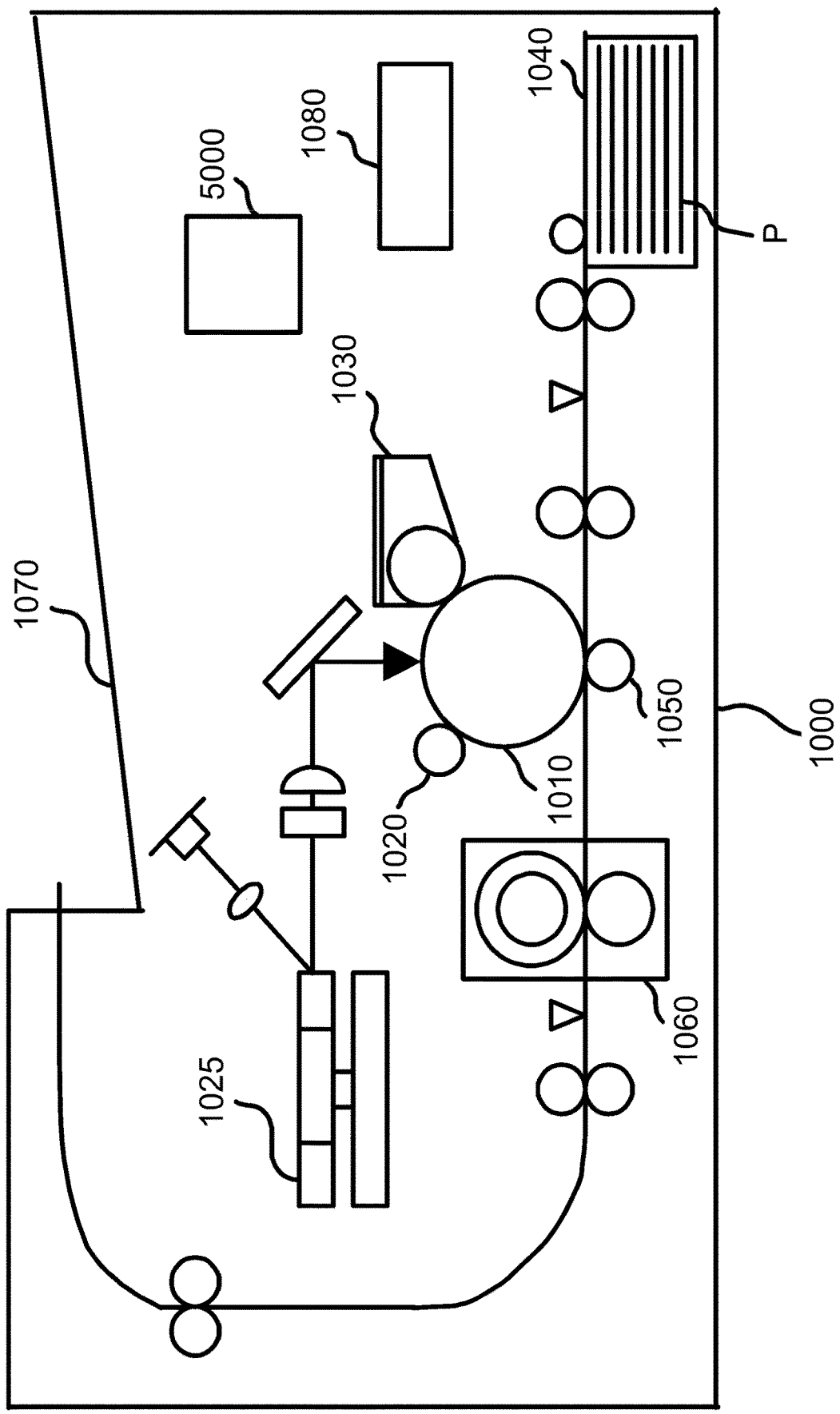

FIG. 8 is a view showing an image forming apparatus according to the embodiment.

DESCRIPTION OF THE EMBODIMENTS

In the following, an embodiment of the present invention will be described in detail with reference to Figures by the embodiment.

EMBODIMENT

[Optical Scanning Device]

Figure 1:
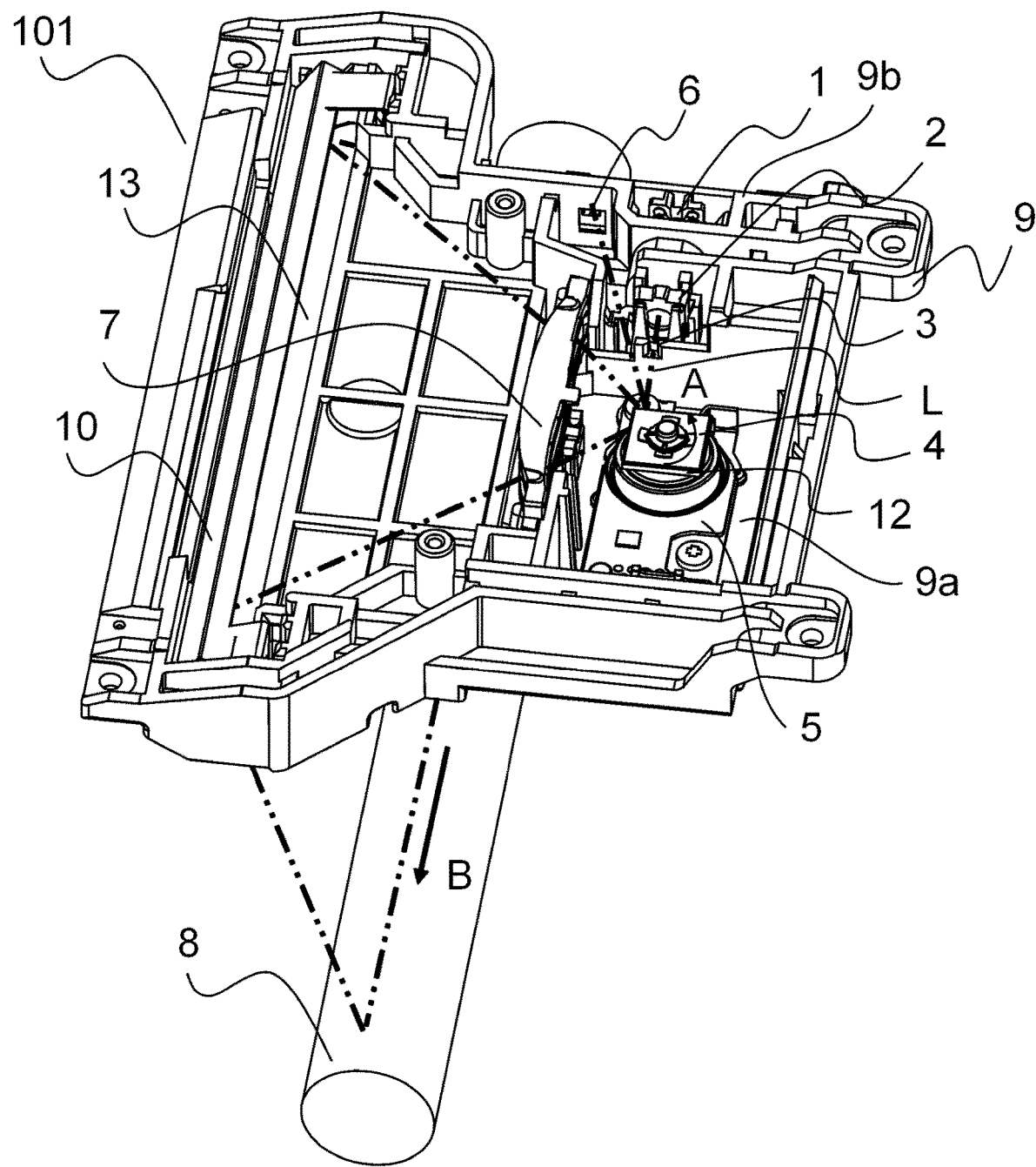
FIG. 1 is a view illustrating a configuration of an optical scanning device according to an embodiment.

An optical scanning device of the present invention according to the embodiment will be specifically described by using from FIG. 1 though FIG. 7. FIG. 1 is a perspective view showing a configuration of an optical scanning device 101 according to the embodiment. The optical scanning device 101 which is shown in FIG. 1 forms an electrostatic latent image on a surface of a photosensitive drum 8 which is an image bearing member by using laser light in an image forming apparatus such as a laser beam printer, a digital copier and a fax machine. The optical scanning device 101 includes a semiconductor laser unit 1 which is a light source which emits a laser luminous flux L (two dot chain line), and an anamorphic collimator lens 2 in which a collimator lens and a cylindrical lens are integrally molded.

The optical scanning device 101 includes a main scanning diaphragm 3 which is comprised of a through groove and a rotational polygon mirror 4. The rotational polygon mirror 4 includes reflecting surfaces 12 and the rotational polygon mirror 4 according to the embodiment includes four reflecting surfaces 12, for example. Incidentally, the number of reflecting surfaces 12 of the rotational polygon mirror 4 is not limited to four. The optical scanning device 101 includes an optical deflector 5 which is a deflection unit which rotationally drives the rotational polygon mirror 4 by a motor which is a driving source. The optical scanning device 101 includes a beam detector (hereinafter, referred to as BD) 6 which is a detecting means of the laser luminous flux L which is deflected and scanned by the optical deflector 5 in order to determine a starting position for writing the laser luminous flux L (light beam) on the surface of the photosensitive drum 8. The optical scanning device 101 includes a scanning lens 7 which is an imaging means of forming the laser luminous flux L which is deflected and scanned on the surface of the photosensitive drum 8, and a return (folding) mirror 10 which deflects the laser luminous flux L which has passed through the scanning lens 7 toward the photosensitive drum 8.

The optical scanning device 101 includes an optical box 9 which is a casing which accommodates each optical member which includes the optical deflector 5. The optical box 9 is made of black resin, for example, and is formed by injection molding. The optical box 9 is provided with an emission opening 13 in which the laser luminous flux L is emitted from an inside of the optical scanning device 101 toward the photosensitive drum 8. Incidentally, an arrow B is in a main scanning direction as will be described below. In the optical box 9, the optical deflector 5, that is the rotational polygon mirror 4, is arranged on a bottom portion 9a. The optical box 9 includes side walls which stand from the bottom portion 9a. The side walls include a first side wall 9b with which a circuit board 15, which will be described below, is provided, a second side wall 9c (see FIG. 3) which is parallel to a direction which is perpendicular to a plane of the circuit board 15 and a third side wall 9d (see FIG. 2) which opposes the second side wall 9c. The opening of the optical box 9 is formed by the side walls, and a cover member 20 blocks the opening. The rotational polygon mirror 4 is provided near the third side wall 9d (see FIG. 2).

[Operation of Optical Scanning Device]

A direction in which the laser luminous flux L is scanned by the optical deflector 5 is defined as a main scanning direction, and a direction which is perpendicular to the main scanning direction is defined as a sub scanning direction, and an operation of the optical scanning device 101 will be described below. The laser luminous flux L which is emitted from the semiconductor laser unit 1 is substantially parallel light or convergent light in the main scanning direction and a convergent light in the sub scanning direction by the anamorphic collimator lens 2. Next, the laser luminous flux L is restricted in a width of the luminous flux in the main scanning direction by the main scanning diaphragm 3. Incidentally, the width of the luminous flux in the sub scanning direction is restricted by an opening hole (sub scanning diaphragm, not shown) which is located upstream of the anamorphic collimator lens 2. The luminous flux which has passed through the sub scanning diaphragm, the anamorphic collimator lens 2 and the main scanning diaphragm 3 forms a focal line image which extends long in the main scanning direction on the reflecting surfaces 12 of the rotational polygon mirror 4. The laser luminous flux L which is formed on the reflecting surfaces 12 of the rotational polygon mirror 4 is deflected and scanned by the rotational polygon mirror 4 which rotates in a direction of an arrow A. The laser luminous flux L, which is deflected and scanned, scans in the main scanning direction on the BD 6.

Next, the laser luminous flux L which is deflected and scanned is incident on the scanning lens 7. The laser luminous flux L, which has formed the focal line image on the rotational polygon mirror 4, becomes a spot of several millimeters on the scanning lens 7 and passes through the scanning lens 7. The laser luminous flux L which has passed through the scanning lens 7 is deflected by the folding mirror 10 and is emitted out of the optical scanning device 101 from the emission opening 13. The laser luminous flux L, which is emitted, scans in a direction of an arrow B in FIG. 1, while the laser luminous flux L is forming the spot on the photosensitive drum 8 in the end. Here, the photosensitive drum 8 is rotationally driven around an axis of a cylinder (rotational axis) of the photosensitive drum 8 and perform sub-scanning. In this way, an electrostatic latent image is formed on the surface of the photosensitive drum 8, which is uniformly charged by a charging means (not shown), in accordance with image information.

[Optical Box]

FIG. 2 is an illustrating view of a supporting portion of the optical box 9, which supports the cover member 20 in the optical scanning device 101 according to the embodiment. The optical scanning device 101 includes the cover member 20 which blocks the opening portion of the optical box 9 which accommodates each optical member. Incidentally, the cover member 20 does not need to block the opening portion completely, but only needs to be arranged in a position which corresponds to a through hole.

The optical box 9 includes supporting portions 31, 32, 33 and 34 which support the cover member 20, and fixing portions 41, 42, 43 and 44 which fix the optical box 9 to a frame of a laser beam printer (not shown). The supporting portions 31, 32, 33 and 34 are provided near the fixing portions 41, 42, 43 and 44, respectively. In a state that the cover member 20 is assembled to the optical box 9, the cover member 20 is supported by the optical box 9 at the four points of the supporting portions 31, 32, 33 and 34.

[Assembling Process of the Cover Member]

Figure 3:
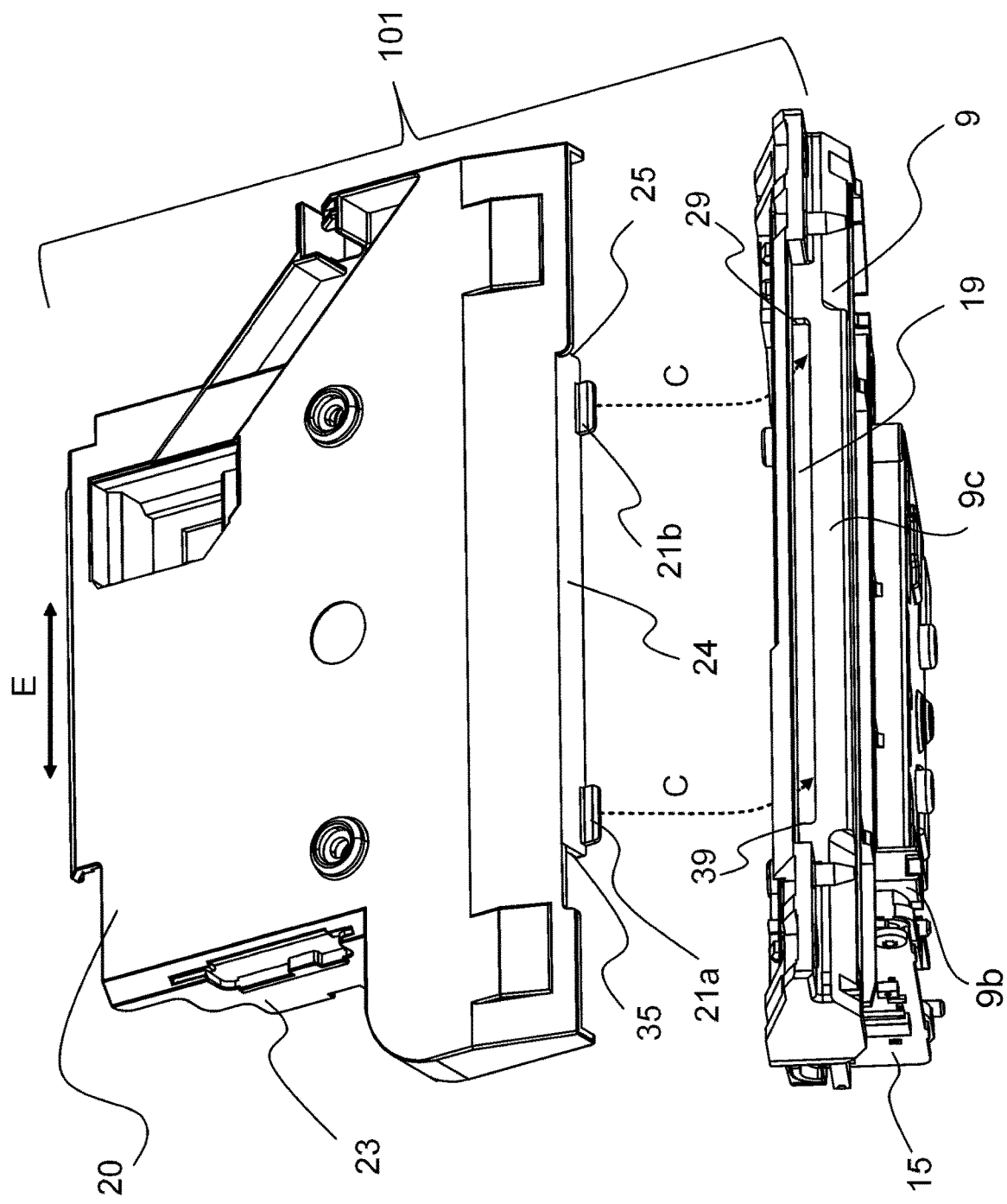
FIG. 3 is a view illustrating an assembly of the cover member according to the embodiment.
Figure 4:
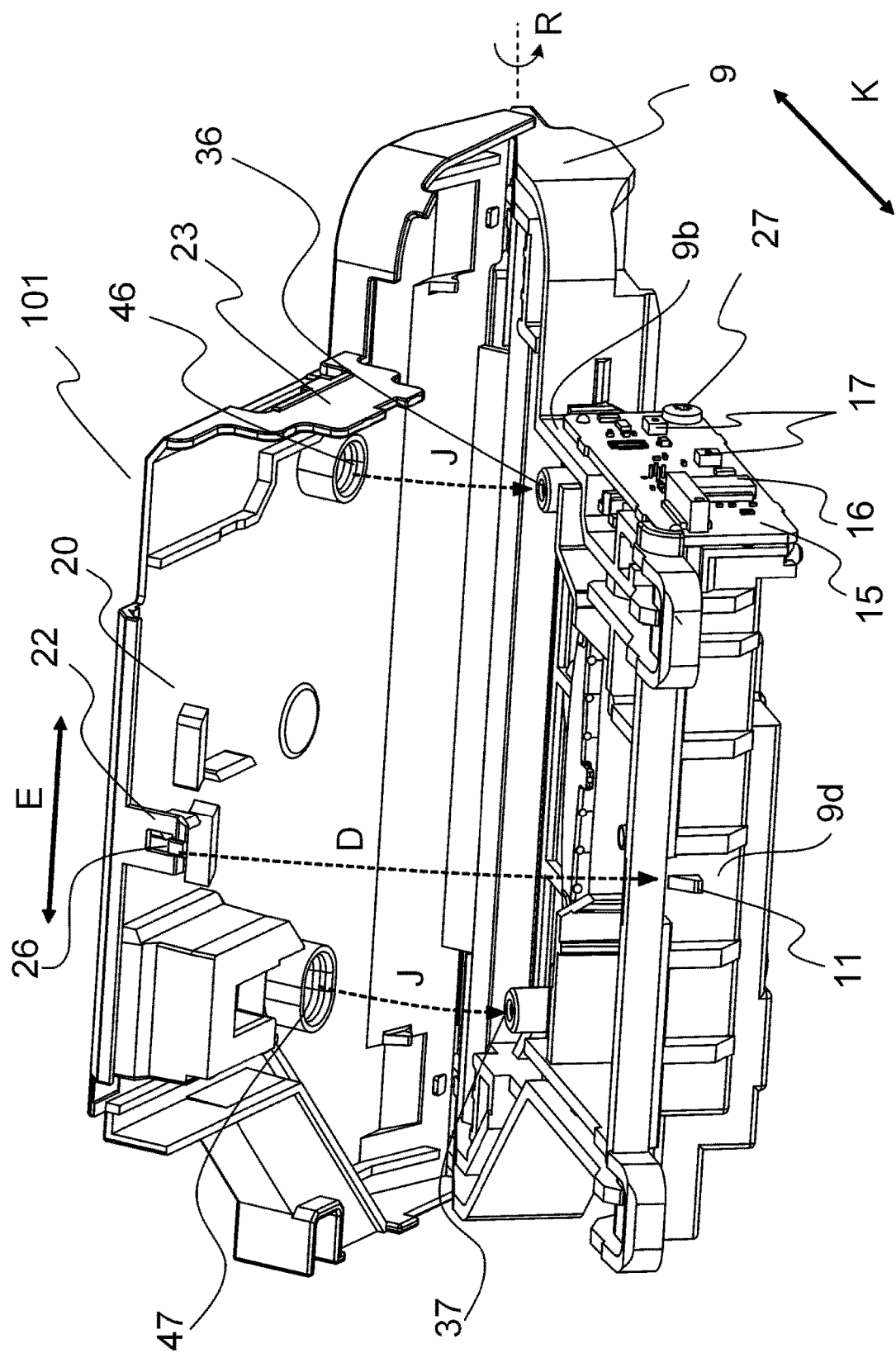
FIG. 4 is a view illustrating the assembly of the cover member according to the embodiment.

Next, an assembly process of the cover member 20 according to the embodiment will be shown by using FIG. 3 and FIG. 4. FIG. 3 is a perspective view showing a state that the cover member 20 according to the embodiment is assembled into the optical box 9, and a view of the optical scanning device 101 from a direction of an arrow M in FIG. 2. The circuit board 15 for driving the semiconductor laser is mounted on an outside of the first side wall 9b of the optical box 9 and is exposed to an outside of the optical scanning device 101. A through hole 19 is provided with the second side wall 9c of the optical box 9, apart from the emission opening 13 which emits the laser luminous flux L, and the through hole 19 is a long shape in the main scanning direction (a direction of an arrow E in FIG. 3), similar to the emission opening 13. The second side wall 9c of the optical box 9 includes a first side surface 39 and a second side surface 29 which form both end portions of the through hole 19 with respect to the direction of the arrow E. In the main scanning direction, the first side surface 39 is a side surface of the through hole 19 which is closer to the circuit board 15, and the second side surface 29 is a side surface of the through hole 19 which is farther from the circuit board 15. Hereinafter, the second side surface 29 is also referred to as a side surface 29 on an opposite side of the circuit board.

The cover member 20 includes a first insertion portion 21a and a second insertion portion 21b. The first insertion portion 21a is provided so that it is located near the circuit board 15 while the cover member 20 blocks the optical box 9. The second insertion portion 21b is provided so that it is located apart from the circuit board 15 while the cover member 20 blocks the optical box 9. The first insertion portion 21a and the second insertion portion 21b are inserted into the through hole 19 of the optical box 9 and function as stoppers for the cover member 20 after assembly.

Further, the cover member 20 includes a restricted portion 24, and the first insertion portion 21a and the second insertion portion 21b are provided with the restricted portion 24. The restricted portion 24 includes a first end portion 35 and a second end portion 25. The first end portion 35 is one end portion of the restricted portion 24 near the first insertion portion 21a and is the end portion which is a closer side to the circuit board 15 in a state that the cover member 20 is assembled to the optical box 9. The second end portion 25 is the other end portion of the restricted portion 24 near the second insertion portion 21b and is the end portion which is farther from the circuit board 15 in the state that the cover member 20 is assembled to the optical box 9. Hereinafter, the second end portion 25 is also referred to as an end portion 25 on the opposite side of the circuit board.

(First Process)

A first process that is a method of assembling the cover member 20 to the optical box 9 (method of assembling the optical scanning device) will be described by using FIG. 3. First, the first insertion portion 21a and the second insertion portion 21b of the cover member 20 is inserted into the through hole 19 of the optical box 9, as shown by a dashed line arrow C in FIG. 3. In this case, the cover member 20 is tilted with respect to the optical box 9, as shown in FIG. 3. When the first insertion portion 21a and the second insertion portion 21b are inserted into the through hole 19, the first end portion 35 and the second end portion 25 on the opposite side of the circuit board are restricted in a direction which is perpendicular to a surface of the circuit board 15 (a direction of an arrow E in FIG. 3) (a direction perpendicular to a plane of the circuit board) by the first side surface 39 and the second side surface 29 on the opposite side of the circuit board.

FIG. 4 is a perspective view showing a state that the first insertion portion 21a and the second insertion portion 21b of the cover member 20 are inserted into the through hole 19 of the optical box 9 as illustrated in FIG. 3, and showing a state in a process of assembling the cover member 20 to the optical box 9. Further, FIG. 4 is a view from a direction of an arrow F in FIG. 2. In this state, a state that the cover member 20 is tilted against the optical box 9 is maintained while the first insertion portion 21a and the second insertion portion 21b are inserted (fitted) into the through hole 19 of the optical box 9.

The cover member 20 includes a locking member 22, and the locking member 22 functions as a stopper for the cover member 20 after assembly. The locking member 22 is provided with a through hole 26. The optical box 9 includes a protrusion portion 11 which protrudes outward from a surface of the third side wall 9d, and the protrusion portion 11 is inserted into the through hole 26 when the cover member 20 blocks the opening portion of the optical box 9.

The circuit board 15 is fixed to the optical box 9 by a screw 27. The circuit board 15 is fixed by the screw 27, while the circuit board 15 is exposed to an outside of the optical box 9. A driving IC 16 is an IC which drives a semiconductor laser which is mounted on the circuit board 15. A variable resistor 17 is mounted on the circuit board 15 to adjust light quantity of the semiconductor laser.

The cover member 20 includes a board protecting portion 23 (protecting portion), and the board protecting portion 23 prevents external contact with electrical elements such as the driving IC 16 and the variable resistor 17 after the cover member 20 is assembled into the optical box 9. The cover member 20 includes a positioning groove 46 and a whirl stop groove 47. On the other hand, the optical box 9 includes a positioning portion 36 and a whirl stop portion 37.

(Second Process)

A second process that is a method of assembling the cover member 20 to the optical box 9 will be described by using FIG. 4. After the first process, it is possible to close the cover member 20 by rotating the cover member 20 in a direction of an arrow R toward the optical box 9, using the first insertion portion 21a, the second insertion portion 21b and the through hole 19 which are described above as rotational axes. As shown by a dashed line arrow D, the locking member 22 is moved to run on the protrusion portion 11, and finally, the protrusion portion 11 is inserted into the through hole 26. At a time that the through hole 26 moves to the same height as the protrusion portion 11 by running on the protrusion portion 11 while the locking member 22 is deformed, the protrusion portion 11 is naturally inserted into the through hole 26, so it is possible to easily complete assembly when the through hole 26, and the locking member 22 and the protrusion portion 11 are locked.

In this process, as illustrated in FIG. 3, the cover member 20 is restricted by the first end portion 35 and the first side surface 39, and the second end portion 25 and the second side surface 29 in the direction perpendicular to the surface of the circuit board 15 (a direction of an arrow E in FIG. 3 and FIG. 4) (a direction perpendicular to the plane of the circuit board 15). Therefore, the board protecting portion 23 does not contact the circuit board 15 or electrical elements which are mounted on the circuit board 15, such as the driving IC 16 and the variable resistor 17, during the assembly process of the cover member 20.

Incidentally, a final positioning relationship of the optical box 9 and the cover member 20 (in the direction of the arrow E and in a direction of an arrow K perpendicular to the arrow E in FIG. 4) is determined as the positioning groove 46 and the positioning portion 36 are fitted and the whirl stop portion 37 is inserted into the whirl stop groove 47 (a dashed line arrow J). Incidentally, a whirl stop groove 46 is a circular hole and the whirl stop groove 47 is a long hole which is long in the main scanning direction (the direction of the arrow E), and a rotation of the cover member 20 around the positioning portion 36 is restricted by the whirl stop portion 37. By the first process and the second process which are described above, it is possible to block the opening portion of the optical box 9 by the cover member 20 so that the board protecting portion 23 does not contact the variable resistor 17, etc. on the circuit board 15.

[Restriction in the Direction of the Arrow E].

A most distinctive configuration of the optical scanning device 101 according to the embodiment, in which the cover member 20 is coupled to the optical box 9 as described above, will be described below. Specifically, relationships, with a distance between the end portion 25 on the opposite side of the circuit board of the restricted portion 24 and the side surface 29 on the opposite side of the circuit board of the through hole 19 and with a distance between the board protecting portion 23 and components which are mounted on the circuit board 15, will be described by using FIG. 5 and FIG. 6.

Part (a) of FIG. 5 is a partial enlarged view of the optical scanning device 101 in a state that the cover member 20 is assembled, when it is viewed in the direction of the arrow M in FIG. 2. That is, part (a) of FIG. 5 is an enlarged view of a right side portion of FIG. 3. For ease of understanding, a partial sectional view, of a cross section which is indicated by a one dot chain line in part (a) of FIG. 5 when it is viewed in a direction of an arrow H, is also shown as part (b) of FIG. 5. Here, the distance between the end portion 25 on the opposite side of the circuit board of the restricted portion 24 and the side surface 29 on the opposite side of the circuit board of the through hole 19 is defined as X.

Incidentally, it is possible to reduce an amount of inflow air and an amount of outflow air which go in and out of the optical scanning device 101 by blocking the through hole 19 with the restricted portion 24. So it is possible to reduce possibility of airborne dust adhering to optical elements such as the rotational polygon mirror 4 by reducing the amount of the inflow air and the amount of the outflow air. In a case that dust adheres to optical elements, the light quantity may be locally decreased in the main scanning direction and uneven density in printed materials may be occurred.

FIG. 6 is a view of the optical scanning device 101 according to the embodiment when it is viewed from a side surface side of the circuit board 15 (the direction of the arrow F in FIG. 2). A distance between the board protecting portion 23 and a closest electrical element (for example, the driving IC 16) among electrical elements in an area which is covered by the board protecting portion 23 is defined as Y In the embodiment, the distance Y is a distance between the driving IC 16 and the board protecting portion 23, however, it is not limited to the driving IC 16, and it is the distance between the board protecting portion 23 and the closest electrical element. In the embodiment, X is less than Y.

Here, in the direction perpendicular to the plane of the circuit board 15 (the direction of the arrow E), when the board protecting portion 23 moves in a direction of approaching the circuit board 15 (a direction toward the left in FIG. 6), the movement in the approaching direction is restricted since the second end portion 25 of the restricted portion 24 contacts the second side surface 29. Therefore, since the distance X between the second end portion 25 and the second side surface 29 is less than the distance Y, the board protecting portion 23 does not interfering with the electrical elements on the circuit board 15. Incidentally, in the direction perpendicular to the plane of the circuit board 15, when the board protecting portion 23 moves in a direction separating from the circuit board 15 (a direction toward the right in FIG. 6), the movement in the separating direction is restricted since the first end portion 35 of the restricted portion 24 contacts the first side surface 39.

In a case of a configuration which meets the relationship which is described above, when the cover member 20 is assembled, in a process of inserting the insertion portion 21 into the through hole 19 and next inserting the protrusion portion 11 into the through hole 26 of the locking member 22, the board protecting portion 23 and the electrical element which is the closest to the board protecting portion 23 does not contact each other. Incidentally, the electrical element which is the closest to the board protecting portion 23 is the driving IC 16 in the case of the embodiment. That is, in advance, the first insertion portion 21a and the second insertion portion 21b are inserted into the through hole 19, and the movement in the direction of the arrow E, especially the direction in which the board protecting section 23 approaches the circuit board 15, is limited to the distance Y (less than X). Therefore, the board protecting portion 23 and the electrical elements on the circuit board 15 do not contact each other during the assembly process.

FIG. 7 is a view illustrating the optical scanning device 101 in the state that the cover member 20 is assembled when it is viewed in the direction of the arrow F in FIG. 2. A portion 53 and a portion 54 are parts of the cover member 20, are supported by the supporting portion 33 (a first supporting portion) and the supporting portion 34 (a second supporting portion) of the optical box 9 which are described in FIG. 2, and are portions which are nodes of vibration when the cover member 20 vibrates. A portion 55 is located at a middle of the portion 53 and the portion 54 (the nodes of vibration) and is a portion which is an antinode of vibration when the cover member 20 vibrates.

The cover member 20 is assembled to the optical box 9 in a state that the locking member 22 is pulled (stress is generated) in a direction of an arrow G by the protrusion portion 11 which is provided with the optical box 9. It is possible to effectively suppress the vibration of the cover member 20 since the protrusion portion 11 which generates the stress is located near the portion 55 which is the antinode of the vibration.

Further, the protrusion portion 11 is provided with the third side wall 9d which is the closest to the rotational polygon mirror 4 among an outer walls of the optical box 9 as shown in FIG. 2. The protrusion portion 11 is possible to increase a sealing degree of the cover member 20 to the optical box 9 by assembling to the optical box 9 while the locking member 22 of the cover member 20 is pulled in the direction of the arrow G. As a result, it is possible to reduce leakage of noise which is generated by the rotation of the rotational polygon mirror 4 to the outside.

In the embodiment, a gap (Y) between the through hole 19 which is provided in the optical box 9 and the side surface 29 on the opposite side of the circuit board 15 of the cover member 20 is smaller than a distance (X) between the electrical elements which are mounted on the circuit board 15 and the cover member 20 which covers the electrical elements (Y is less than X). Therefore, when assembling the cover member 20, the board protecting portion 23 is able to maintain stable quality without damaging electrical elements, etc. on the circuit.

[Image Forming Apparatus]

A schematic configuration of a laser beam printer as an example of an image forming apparatus is shown in FIG. 8. A laser beam printer 1000 (hereinafter referred to as a printer 1000) is provided with a photosensitive drum 1010, a charging portion 1020 and a developing portion 1030 which is a developing means. The photosensitive drum 1010 is an image bearing member on which an electrostatic latent image is formed, corresponding to the photosensitive drum 8 which is described above.

The charging portion 1020 uniformly charges the photosensitive drum 1010. The optical scanning device 1025, which is an exposure means, forms an electrostatic latent image by scanning laser light on the photosensitive drum 1010 according to image data. Incidentally, the optical scanning device 1025 is simply shown in FIG. 8. The optical scanning device 1025 corresponds to the optical scanning device 101 according to the embodiment. The developing portion 1030 forms a toner image which is a developer image by developing the electrostatic latent image which is formed on the photosensitive drum 1010 by using toner which is developer.

The toner image which is formed on the photosensitive drum 1010 (on the image bearing member) is transferred to a sheet P as a recording material which is supplied from a cassette 1040 by a transfer portion 1050 which is a transfer means. And the unfixed toner image which is transferred to the sheet P is fixed by a fixing device 1060 and the sheet P is discharged to a tray 1070. An image forming portion is comprised of the photosensitive drum 1010, the charging portion 1020, the developing portion 1030, and the transfer portion 1050. Further, the printer 1000 is provided with a power source device 1080 and electric power is supplied from the power source device 1080 to driving portions such as a motor and a control portion 5000. The control portion 5000 includes a CPU (not shown) and controls an image forming operation by the image forming portion and conveying operation of the sheet P, etc.

Once the printer 1000 finishes a print operation, after a predetermined period of time is passed, the printer 1000 transitions to a standby state that it can execute a print operation immediately. After a further predetermined period of time, the printer 1000 transitions from the standby state to a sleep state which is a low power consumption mode, in order to reduce power consumption during standby. The printer 1000 has three states which are the sleep state which is a second mode, the standby state and a print state which is a first mode, and the control portion 5000 transitions the printer 1000 to each state. Incidentally, an imaging forming apparatus, in which the optical scanning device 101 according to the embodiment can be applied, is not limited to a configuration which is introduced in FIG. 8.

As described above, according to the embodiment, it is possible to improve the assembly quality of the cover member of the optical scanning device with the inexpensive configuration while protecting the circuit board.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-034317 filed on Mar. 7, 2023, which is hereby incorporated by reference herein in its entirety.

What is claimed is:

1. An optical scanning device comprising:
a light source;
a deflection unit configured to deflect a light beam emitted from the light source;
a casing including a bottom portion on which the deflection unit is disposed and a side wall stood from the bottom portion;
a circuit board provided on the side wall in a state of being exposed to an outside of the casing and mounted with a plurality of electric elements for driving the light source; and
a cover member configured to close an opening, formed by the side wall, of the casing,
wherein the side wall includes a first side wall provided with the circuit board and a second side wall parallel to a direction perpendicular to a plane of the circuit board,
wherein the second side wall includes a through hole elongated in the direction perpendicular to the plane, a first side surface of the through hole forming a side close to the circuit board, and a second side surface of the through hole forming a side far from the circuit board,
wherein the cover member includes a protective portion for protecting the circuit board in a state in which the cover member closes the opening, and a restricted portion disposed in a position corresponding to the through hole in the state in which the cover member closes the opening, the restricted portion including a first end portion closed to the first side surface and a second end portion closed to the second side surface,
wherein the restricted portion includes a first insertion portion provided adjacent to the first end portion and inserted into the through hole when the cover member is assembled to the casing, and a second insertion portion provided adjacent to the second end portion and inserted into the through hole when the cover member is assembled to the casing, and
wherein a distance between the second end portion and the second side surface in the direction perpendicular to the plane is smaller than a distance between the protective portion and a closest electric element of the plurality of electric elements to the protective portion in a state in which the first insertion portion and the second insertion portion are inserted into the through hole.

2. An optical scanning device according to claim 1, wherein the direction perpendicular to the plane is a main scanning direction of the light beam deflected by the deflection unit.

3. An optical scanning device according to claim 1, wherein the casing includes a third side wall opposing to the second side wall,
wherein the third side wall includes a projecting portion, and
wherein the cover member incudes a locking portion locked to the projection portion in the state in which the first insertion portion and the second insertion portion are inserted into the through hole.

4. An optical scanning device according to claim 3, wherein the casing includes a first supporting portion and a second supporting portion adjacent to the third side wall and aligned in a direction parallel to a direction perpendicular to the plane, and
wherein the locking portion is provided to be positioned in an intermediate position between the first supporting portion and the second supporting portion in the direction perpendicular to the plane.

5. An optical scanning device according to claim 4, wherein the first supporting portion and the second supporting portion become nodes of vibration when the optical scanning device is vibrated, and
wherein the locking portion is provided in a position to be an antinode of the vibration.

6. An optical scanning device according to claim 3, wherein the deflection unit is provided in a position closer to the third side wall than to the second side wall.

7. An image forming apparatus comprising:
an optical scanning device according to claim 1;
an image bearing member on which an electrostatic latent image is formed by the light beam, emitted from the optical scanning device, being scanned;
a developing means configured to form a developer image by developing the electrostatic latent image formed on the image bearing member with a developer; and
a transfer means configured to transfer the developer image to a recording material.

8. An optical scanning device comprising:
a light source;
a deflection unit configured to deflect a light beam emitted from the light source;
a casing including a bottom portion on which the deflection unit is disposed and a side wall stood from the bottom portion;
a circuit board provided on the side wall in a state of being exposed to an outside of the casing and mounted with a plurality of electric elements for driving the light source; and
a cover member configured to close an opening, formed by the side wall, of the casing,
wherein the side wall includes a first side wall provided with the circuit board and a second side wall parallel to a direction perpendicular to a plane of the circuit board,
wherein the second side wall includes a through hole elongated in the direction perpendicular to the plane, a first side surface of the through hole forming a side close to the circuit board, and a second side surface of the through hole forming a side far from the circuit board,
wherein the cover member includes a protective portion for protecting the circuit board in a state in which the cover member closes the opening, and a restricted portion disposed in a position corresponding to the through hole in the state in which the cover member closes the opening, the restricted portion including a first end portion closed to the first side surface and a second end portion closed to the second side surface,
wherein the restricted portion includes a insertion portion inserted into the through hole, and
wherein a distance between the second end portion and the second side surface in the direction perpendicular to the plane is smaller than a distance between the protective portion and a closest electric element of the plurality of electric elements to the protective portion in a state in which the insertion portion is inserted into the through hole.

9. An optical scanning device according to claim 8, wherein the direction perpendicular to the plane is a main scanning direction of the light beam deflected by the deflection unit.

10. An optical scanning device according to claim 8, wherein the casing includes a third side wall opposing to the second side wall,
wherein the third side wall includes a projecting portion, and
wherein the cover member incudes a locking portion locked to the projection portion in the state in which the insertion portion is inserted into the through hole.

11. An optical scanning device according to claim 10, wherein the casing includes a first supporting portion and a second supporting portion adjacent to the third side wall and aligned in a direction parallel to a direction perpendicular to the plane, and
wherein the locking portion is provided to be positioned in an intermediate position between the first supporting portion and the second supporting portion in the direction perpendicular to the plane.

12. An optical scanning device according to claim 10, wherein the deflection unit is provided in a position closer to the third side wall than to the second side wall.

13. An image forming apparatus comprising:
an optical scanning device according to claim 8;
an image bearing member on which an electrostatic latent image is formed by the light beam, emitted from the optical scanning device, being scanned;
a developing means configured to form a developer image by developing the electrostatic latent image formed on the image bearing member with a developer; and
a transfer means configured to transfer the developer image to a recording material.

* * * * *